United States Patent
Dow et al.

(10) Patent No.: US 9,518,652 B2
(45) Date of Patent: *Dec. 13, 2016

(54) APPARATUS AND METHOD FOR PROVIDING A MANUAL OVERRIDE TO SHIFT BY WIRE ACTUATOR

(71) Applicant: INTEVA PRODUCTS, LLC, Troy, MI (US)

(72) Inventors: Ian J. Dow, Bloomfield, MI (US); John R. Rice, New Baltimore, MI (US); Donald M. Perkins, Sterling Heights, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/190,238

(22) Filed: Feb. 26, 2014

(65) Prior Publication Data
US 2014/0174215 A1 Jun. 26, 2014

Related U.S. Application Data

(63) Continuation of application No. 13/862,074, filed on Apr. 12, 2013.
(Continued)

(51) Int. Cl.
| | |
|---|---|
| F16H 59/10 | (2006.01) |
| F16D 23/12 | (2006.01) |
| F16D 11/10 | (2006.01) |
| F16H 61/32 | (2006.01) |
| G05G 1/04 | (2006.01) |

(Continued)

(52) U.S. Cl.
CPC .............. *F16H 59/105* (2013.01); *F16D 11/10* (2013.01); *F16D 23/12* (2013.01); *F16H 59/044* (2013.01); *F16H 59/10* (2013.01); *F16H 61/32* (2013.01); *G05G 1/04* (2013.01); *F16D 2023/123* (2013.01); *F16H 2061/226* (2013.01); *F16H 2061/326* (2013.01); *Y10T 74/18128* (2015.01); *Y10T 74/20396* (2015.01)

(58) Field of Classification Search
CPC ................................................ Y10T 74/18128
See application file for complete search history.

(56) References Cited

U.S. PATENT DOCUMENTS

| | | | | |
|---|---|---|---|---|
| 2,237,749 | A | * | 4/1941 | Simon ............................. 74/34 |
| 2,508,577 | A | | 5/1950 | Maeser |

(Continued)

FOREIGN PATENT DOCUMENTS

| | | |
|---|---|---|
| DE | 4026573 A1 | 3/1991 |
| GB | 2283061 A | 4/1995 |

OTHER PUBLICATIONS

MCS(Mobile Control Systems SA); Shift-By-Wire Controls for Automatic Transmissions; 2 pages.

(Continued)

*Primary Examiner* — Mark Manley
(74) *Attorney, Agent, or Firm* — Inteva Products, LLC

(57) ABSTRACT

An actuator for a shift by wire system is provided. The actuator having: a motor; a rack; a gear train configured to cause linear movement of the rack in response to rotational movement of the motor; a clutch mechanism for coupling and decoupling the rack to the motor; and a manual override for operating the clutch mechanism.

18 Claims, 6 Drawing Sheets

Related U.S. Application Data

(60) Provisional application No. 61/769,386, filed on Feb. 26, 2013, provisional application No. 61/769,388, filed on Feb. 26, 2013, provisional application No. 61/625,179, filed on Apr. 17, 2012, provisional application No. 61/769,386, filed on Feb. 26, 2013, provisional application No. 61/769,388, filed on Feb. 26, 2013.

(51) Int. Cl.
*F16H 61/22* (2006.01)
*F16H 59/04* (2006.01)

(56) References Cited

U.S. PATENT DOCUMENTS

| | | | |
|---|---|---|---|
| 2,621,543 | A | 12/1952 | Rossmann |
| 2,645,835 | A | 7/1953 | Bennett et al. |
| 2,652,932 | A | 9/1953 | Funnell |
| 2,663,956 | A | 12/1953 | Simpson, Jr. et al. |
| 2,950,543 | A | 8/1960 | Ritter et al. |
| 3,033,531 | A | 5/1962 | Patterson, III et al. |
| 3,040,998 | A | 6/1962 | Rogers |
| 3,301,366 | A | 1/1967 | Steinberg |
| 3,545,292 | A | 12/1970 | Smith et al. |
| 4,838,485 | A | 6/1989 | Rinkewich |
| 4,892,014 | A | 1/1990 | Morell et al. |
| 5,035,158 | A | 7/1991 | Leigh-Monstevens |
| 5,094,115 | A * | 3/1992 | Michihira ............... B60K 37/06 475/7 |
| 5,448,027 | A | 9/1995 | Hoffman et al. |
| 5,588,330 | A | 12/1996 | Kataumi et al. |
| 5,769,493 | A | 6/1998 | Pejathaya |
| 6,016,717 | A | 1/2000 | Wheeler |
| 6,196,078 | B1 | 3/2001 | DeJonge et al. |
| 6,295,887 | B1 | 10/2001 | DeJonge et al. |
| 6,629,473 | B2 | 10/2003 | Syamoto et al. |
| 6,662,924 | B2 | 12/2003 | Giefer et al. |
| 6,732,847 | B1 | 5/2004 | Wang |
| 6,851,538 | B2 | 2/2005 | Meyer et al. |
| 6,918,314 | B2 | 7/2005 | Wang |
| 6,951,528 | B2 | 10/2005 | Ewinger et al. |
| 7,210,370 | B2 | 5/2007 | Giefer et al. |
| 7,241,244 | B2 | 7/2007 | Wang |
| 7,354,372 | B2 | 4/2008 | Wang |
| 7,393,304 | B2 | 7/2008 | Wilde et al. |
| 7,469,614 | B2 | 12/2008 | Wang |
| 7,597,022 | B2 | 10/2009 | Wang |
| 7,597,023 | B2 | 10/2009 | Kortge et al. |
| 8,327,732 | B2 | 12/2012 | Giefer et al. |
| 8,464,601 | B2 | 6/2013 | Giefer et al. |
| 8,534,151 | B2 | 9/2013 | Johnson et al. |
| 8,540,341 | B2 | 9/2013 | Yamamoto |
| 8,607,657 | B2 | 12/2013 | Haevescher |
| 8,656,802 | B2 | 2/2014 | Behounek et al. |
| 8,788,158 | B2 | 7/2014 | Kim |
| 2002/0134185 | A1* | 9/2002 | Tsuzuki et al. .............. 74/473.1 |
| 2002/0170376 | A1 | 11/2002 | Giefer et al. |
| 2003/0221499 | A1 | 12/2003 | Wong |
| 2008/0302628 | A1* | 12/2008 | Kimura et al. .............. 192/220 |
| 2010/0250055 | A1 | 9/2010 | Ito et al. |
| 2013/0269467 | A1 | 10/2013 | Rice |
| 2014/0238161 | A1* | 8/2014 | Dow ....................... F16D 23/12 74/34 |
| 2016/0061316 | A1 | 3/2016 | Rice et al. |

OTHER PUBLICATIONS

Development of •Electric Actuator for Shift-by-wire• (NTN Corporation); 2 pages.
Transmission Diges; Shift by Wire; Author: Wayne Colonna; pp. 52-56.
English Translation to GB2283061 Abstract.
English Abstract for DE4026573A1—Mar. 14, 1991; 1 pg.

* cited by examiner

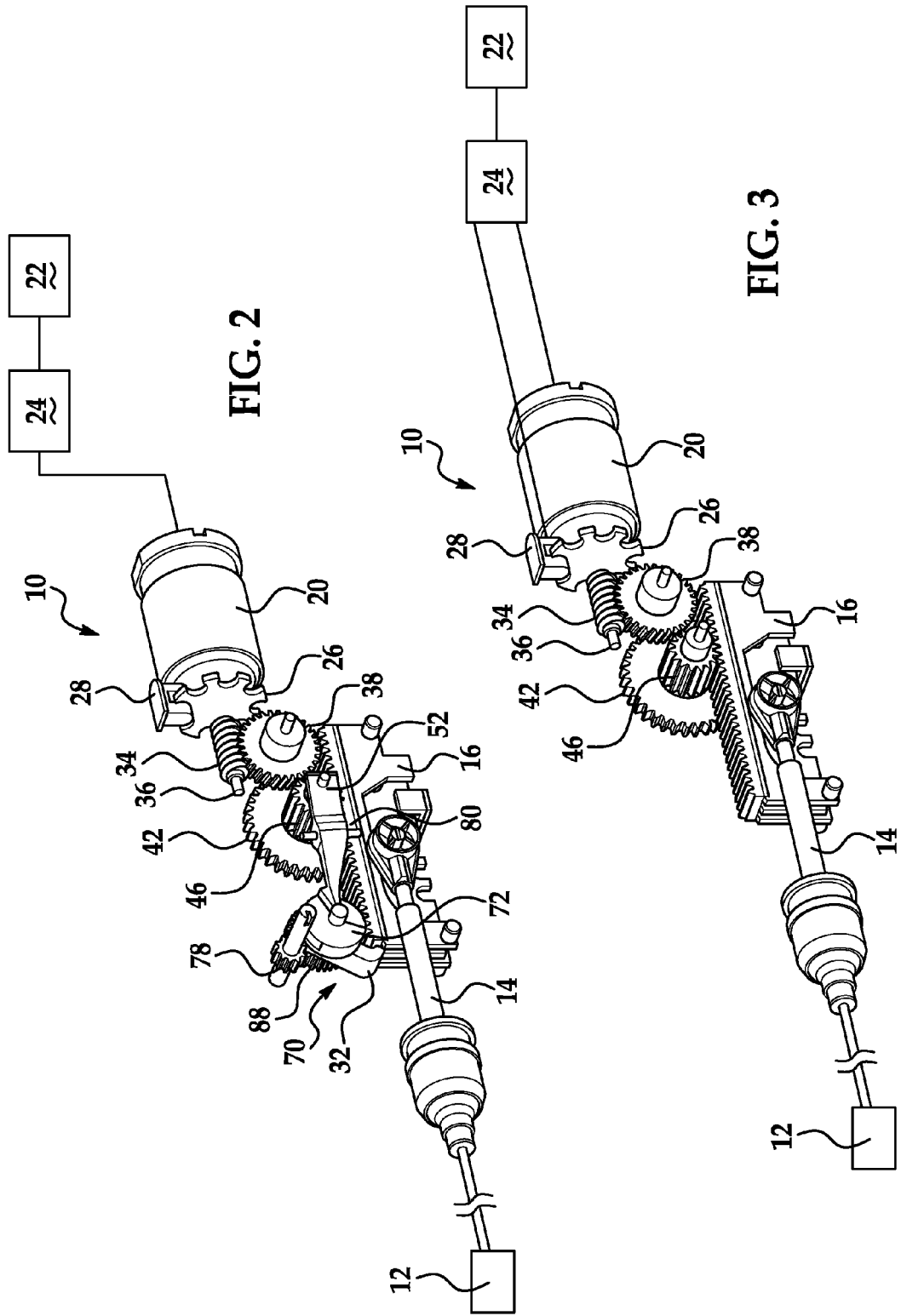

APPARATUS AND METHOD FOR PROVIDING A MANUAL OVERRIDE TO SHIFT BY WIRE ACTUATOR

CROSS REFERENCE TO RELATED APPLICATIONS

This application claims the benefit of U.S. Provisional Patent Application Ser. No. 61/769,386 filed Feb. 26, 2013, the entire contents of which are incorporated herein by reference thereto.

This application also claims the benefit of U.S. Provisional Patent Application Ser. No. 61/769,388 filed Feb. 26, 2013, the entire contents of which are incorporated herein by reference thereto.

This application is also a continuation of U.S. Ser. No. 13/862,074 filed Apr. 12, 2013, which claims priority to the following U.S. Provisional Patent Application Ser. Nos. 61/625,179 filed Apr. 17, 2012; 61/769,386 filed Feb. 26, 2013; and 61/769,388 filed Feb. 26, 2013, the entire contents of each of the aforementioned applications are incorporated herein by reference thereto.

TECHNICAL FIELD

Exemplary embodiments of the present invention relate to an actuator for a shift by wire system and, more particularly, to a manual override system for an electronically controlled linkage.

BACKGROUND

Vehicles provide a number of controls allowing the driver of the vehicle to control various functions of the vehicle during operation. One control that is typically provided is a means for shifting the vehicle transmission. Automatic transmissions include a limited number of control selections such as park, reverse, neutral and drive as well as variants thereof.

In some automatic transmissions, a shift lever or mechanism is generally provided, wherein the driver operates the vehicle by moving the shift lever in a pattern in order to shift gears of the transmission. In some contemplated applications, the shifting of the transmission is achieved through an electronic system or shift by wire system wherein signals are provided to an electric motor coupled to the transmission via a button or actuator located within the vehicle compartment.

In an electronic system, an operator may not be able to shift the transmission if the vehicle loses power or there is a failure of one of the sensors and/or the motor of the electrical system.

Accordingly, it is desirable to provide an actuator for an electronic shift system wherein manual operation thereof is provided.

SUMMARY OF THE INVENTION

According to one exemplary embodiment of the present invention, an actuator for a shift by wire system is provided. The actuator having: a motor; a rack; a gear train configured to cause linear movement of the rack in response to rotational movement of the motor; a clutch mechanism for coupling and decoupling the rack to the motor; and a manual override for operating the clutch mechanism.

In another exemplary embodiment, a shift by wire system for a vehicle transmission is provided. The system having: an input device; a motor; a microcontroller operatively coupled to the motor and configured to receive signals from the input device to operate the motor; a sensor operatively coupled to the microcontroller and configured to receive signals from sensor, wherein the signals from the sensor are indicative of a position of the motor; a rack; a gear train configured to cause linear movement of the rack in response to rotational movement of the motor; a clutch mechanism for coupling and decoupling the rack to the motor; and a manual override for operating the clutch mechanism.

In yet another exemplary embodiment, a method for manually overriding a shift by wire system is provided. The method including the steps of: decoupling a rack of the shift by wire system from a motor by rotating a cam gear from a first position in a first direction to an intermediate position wherein a clutch spool is moved from a first position, wherein the clutch spool couples the motor to the rack to a second position, wherein the clutch spool decouples the rack from the motor; and further rotating the cam gear in the first direction from the intermediate position to a second position wherein a lever moves the rack after it has been decoupled from the motor, wherein the cam gear is spring biased into the first position and the clutch spool is spring biased into the first position.

In yet another embodiment, a clutch mechanism for coupling and decoupling a motor to a rack is provided. The clutch mechanism having: a clutch lever pivotally mounted to an axis for movement from a first position to a second position; a cam gear having a cam surface, wherein rotational movement of the cam gear causes the cam surface to move the clutch lever from the first position to the second position; and a gear train configured to cause linear movement of the rack in response to rotational movement of the motor, wherein movement of the clutch lever from the first position to the second position disconnects a pair of gears of the gear train.

In yet another embodiment, a method of decoupling and coupling a motor to a rack is provided. The method including the steps of: decoupling the rack from the motor by rotating a cam gear from a first position in a first direction to an intermediate position wherein a clutch spool is moved from a first position, wherein the clutch spool couples the motor to the rack to a second position, wherein the clutch spool decouples the rack from the motor; and further rotating the cam gear in the first direction from the intermediate position to a second position wherein a lever moves the rack after it has been decoupled from the motor, wherein the cam gear is spring biased into the first position and the clutch spool is spring biased into the first position and wherein the second direction is perpendicular to the first direction.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which:

FIG. 2 is a perspective view of the actuator illustrated in FIG. 1;

FIG. 3 is a perspective view of the actuator illustrated in FIG. 1 with portions of a clutch mechanism removed for illustration purposes;

DETAILED DESCRIPTION

Figure 1:
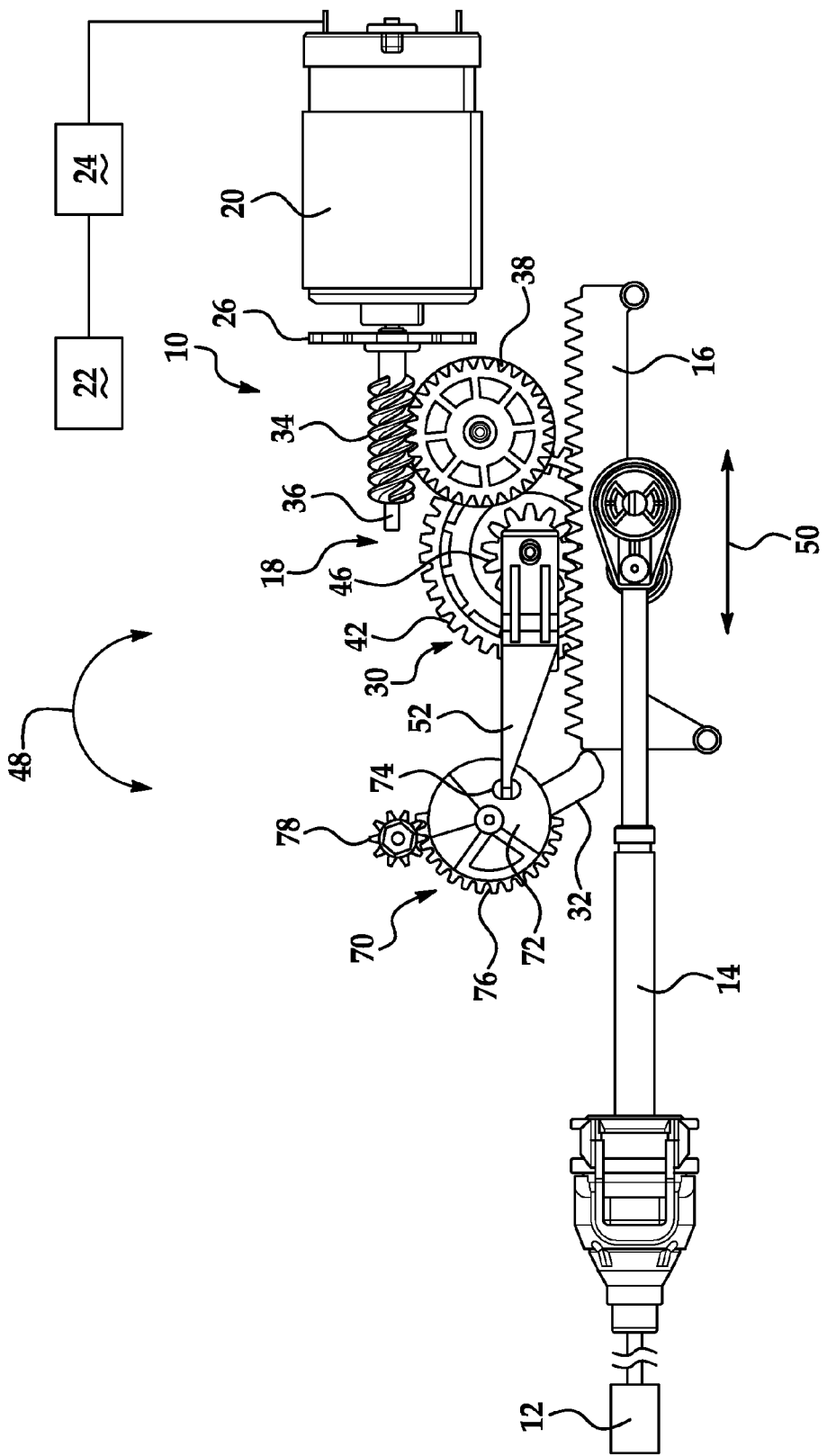
FIG. 1 is a view of an actuator in accordance with one non-limiting exemplary embodiment of the present invention.

Referring now to the FIGS., an actuator 10 for use in a shift by wire system is illustrated. In one non-limiting exemplary embodiment, the actuator is configured to be mounted under a console in the passenger compartment of the vehicle or directly on a transmission of the vehicle or in any other suitable location. For use in vehicular applications, the actuator 10 needs to move a vehicle transmission 12 (illustrated schematically) into a specific gear. In one exemplary embodiment, the actuator is directly coupled to the transmission or is coupled thereto by a cable attachment 14. As mentioned above, there is a need to provide a manual override in order to move the transmission from one position to another in the event of a power failure or a failure of a component of the shift by wire system. For example, there may be a need to move the transmission out of a park position into a neutral or other position in order to allow for towing of the vehicle.

In the illustrated embodiment, a rack 16 is coupled to the transmission either directly or by the cable 14 and is driven by a gear train 18 powered by a single motor 20. Input signals from a driver select device 22 are processed by a controller or microcontroller 24 operatively coupled to the motor 20 using feedback signals from the actuator to identify its position. In one embodiment, the driver select device 22 (illustrated schematically) may be any one of a push button, lever, sensor, switch or any other equivalent device capable of providing signals to the microcontroller in order to operate motor 20 and thus operate the transmission in a shift by wire process, wherein there is not actual physical link directly between device 22 and transmission 12.

In one embodiment, an encoder 26 and sensor 28 are also operatively coupled to the controller or microcontroller 24 so that feedback signals are provided to the microcontroller. In one non-limiting exemplary embodiment, controller or microcontroller 24 comprises a microprocessor, microcontroller or other equivalent processing device capable of executing commands of computer readable data or program for executing a control algorithm that controls the operation of the actuator and/or shift by wire system. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

In accordance with an exemplary embodiment of the present invention, a manual override is provided through the use of a clutch mechanism 30 configured to disengage the drivetrain of the vehicle from the rack 16 of the actuator 10. As used herein, clutch mechanism 30 may refer to the components necessary to input a manually applied user action to decouple the rack from the motor and/or subsequently move the same or alternatively anyone of the components that performs the aforementioned actions or sub actions necessary to perform the aforementioned actions.

In one embodiment, the clutch mechanism 30 or a component thereof further comprises a lever 32 configured to move the rack independently by a pre-described amount.

During normal electrical operation (e.g. shift by wire) inputs via device 22 are provided to the microcontroller 24 which in turn operates motor 20. As motor 20 is operated a worm 34 coupled to a shaft 36 of the motor 20 is rotated. Rotation of worm 34 causes rotation of worm gear 38. Worm gear 38 is also coupled to a gear 40 which rotates with worm gear 38 about an axis 42. Gear 40 is configured to mesh with a gear 44 coupled to a gear 46 that is configured to mesh with rack 16. Accordingly rotation of worm gear 38 in the directions of arrows 48 causes linear movement of rack 16 in the direction of arrows 50 which in turn causes a corresponding movement of the gears of the transmission coupled thereto either directly or indirectly.

As mentioned above, encoder 26 is also coupled to shaft 36 so that the rotational movement and location of worm 34 as well as rack 16 can be fed back to microcontroller 24.

As previously discussed, power loss to the vehicle or system or malfunction of one of the components of the shift by wire system may prevent operation of the vehicle transmission and more particularly, prevent the same from being shifted from one position to another position more suitable for operation during the above malfunction (e.g., vehicle towing, etc.).

In accordance with one exemplary embodiment of the present invention, clutch mechanism 30 is provided to achieve manual operation of the actuator in the event of such a failure mentioned above. Clutch mechanism 30 comprises a clutch lever 52 configured to move a clutch spool or clutch component 54 from a first position wherein gear 46 is coupled to gear 42 by for example, a plurality of pins 56 of the clutch spool which when are in the first position couple gear 46 to gear 42 by for example engaging portions or openings of gear 42 and gear 46 and thus the rack 16 is directly coupled to motor 20 to a second position wherein pins 56 no longer couple gear 46 to gear 42 (e.g., pins 56 are moved out of engagement with both gears 42 and 46 or pins only engage one of gears 42 and 46) thus rack 16 is no longer coupled to motor 20.

Figure 4:
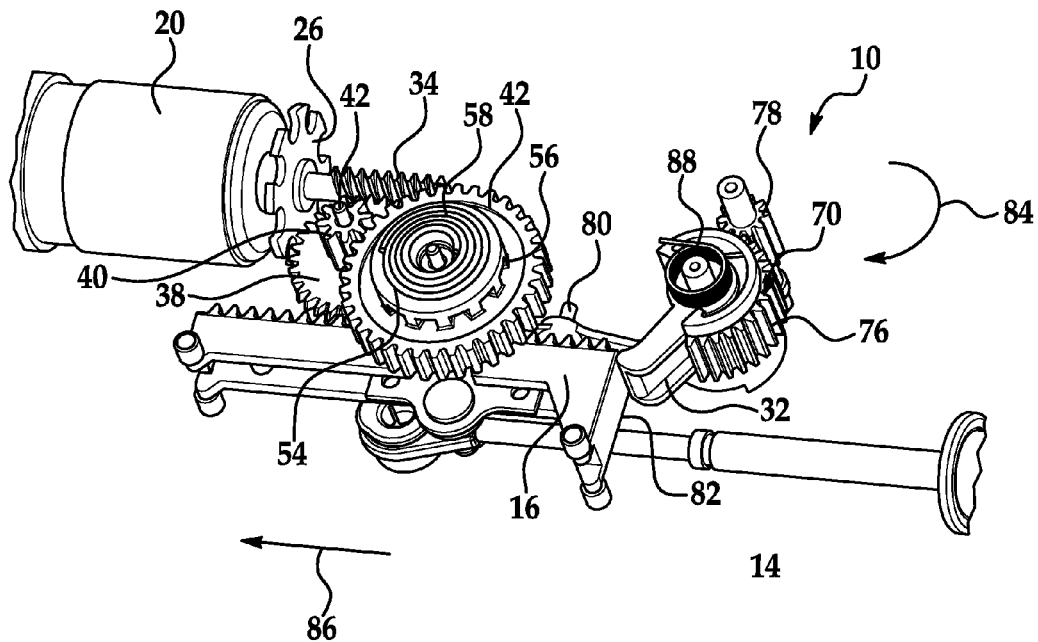
FIGS. 4 and 5 are other perspective views of the actuator.
Figure 5:
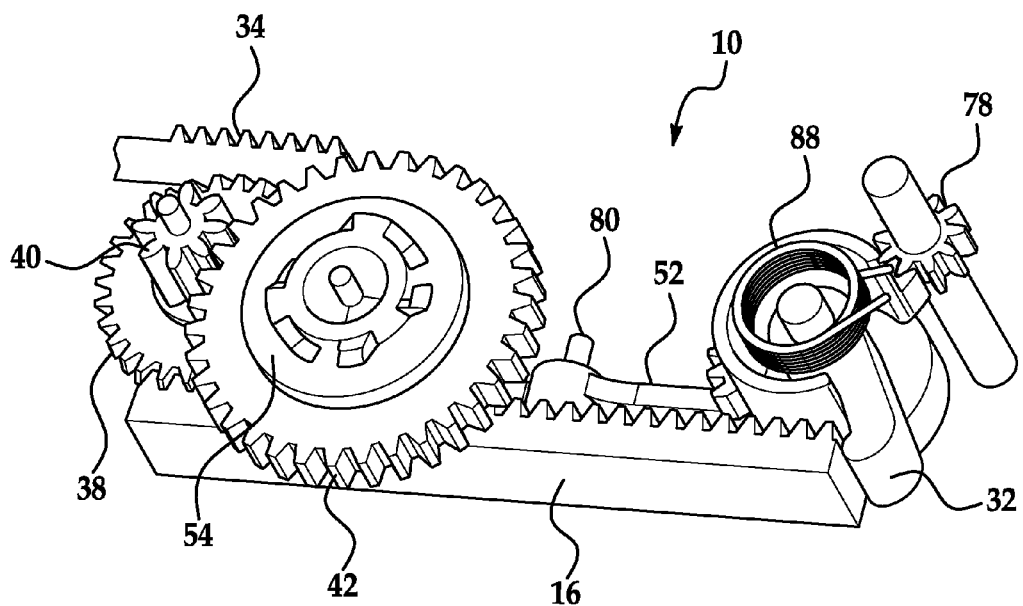
Figure 6:
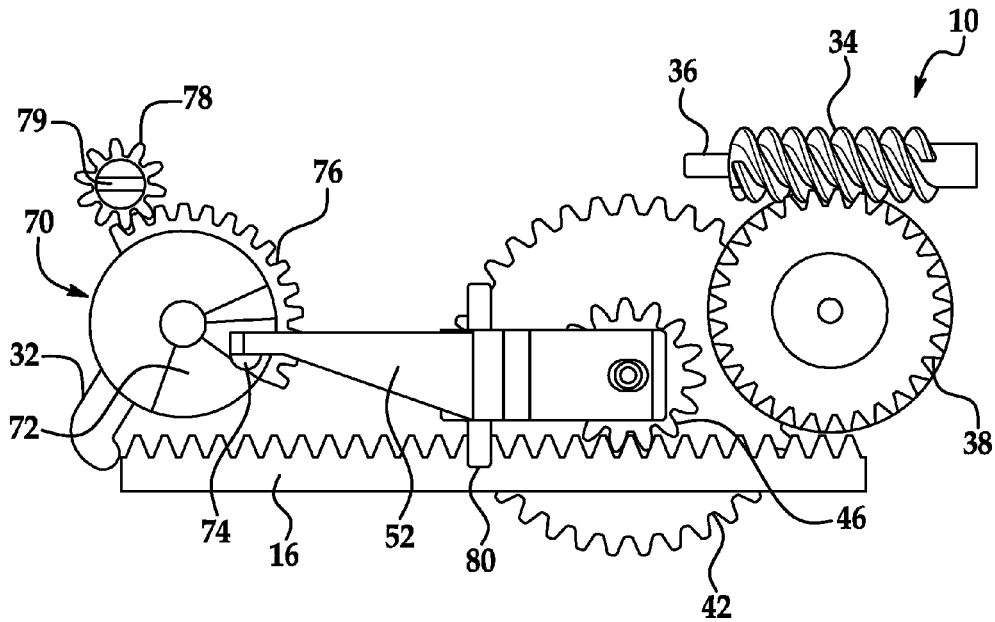
FIGS. 6-9 are views illustrating movement of the clutch mechanism in accordance with one exemplary embodiment.
Figure 7:
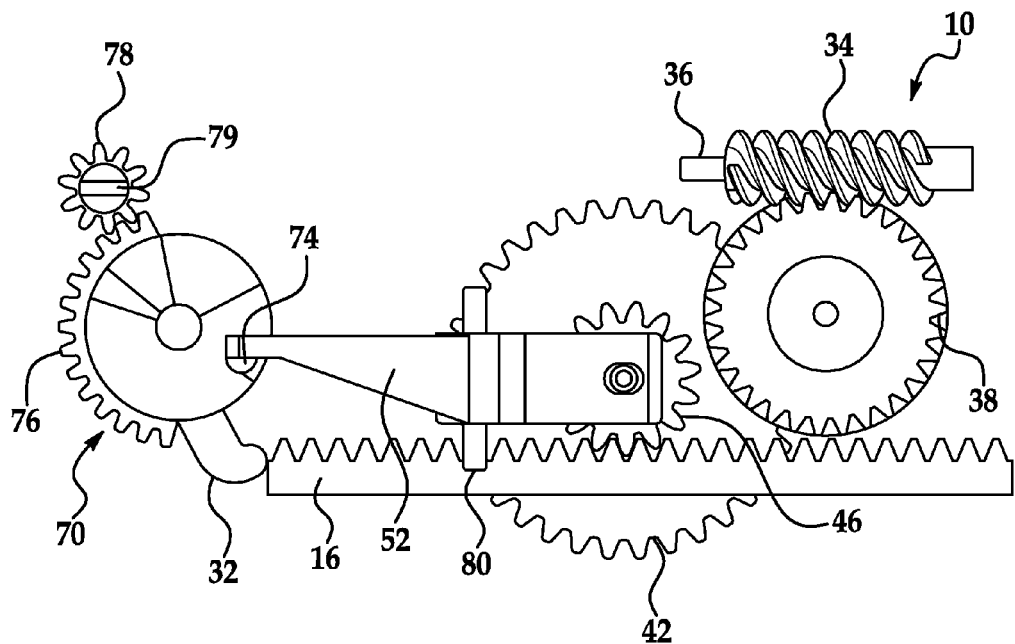
Figure 8:
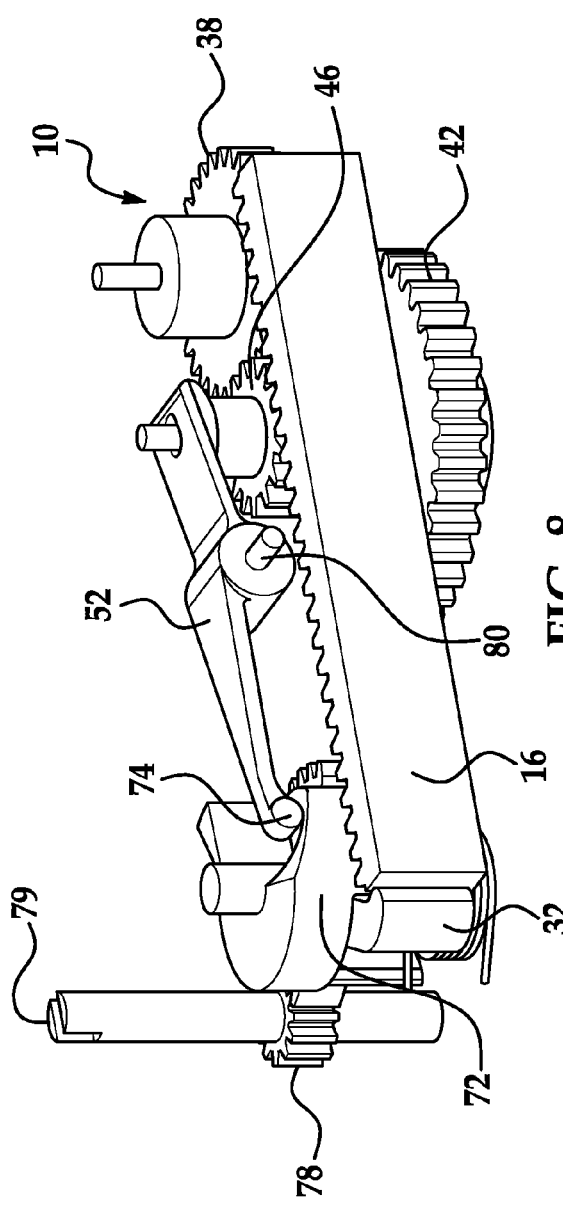
Figure 9:
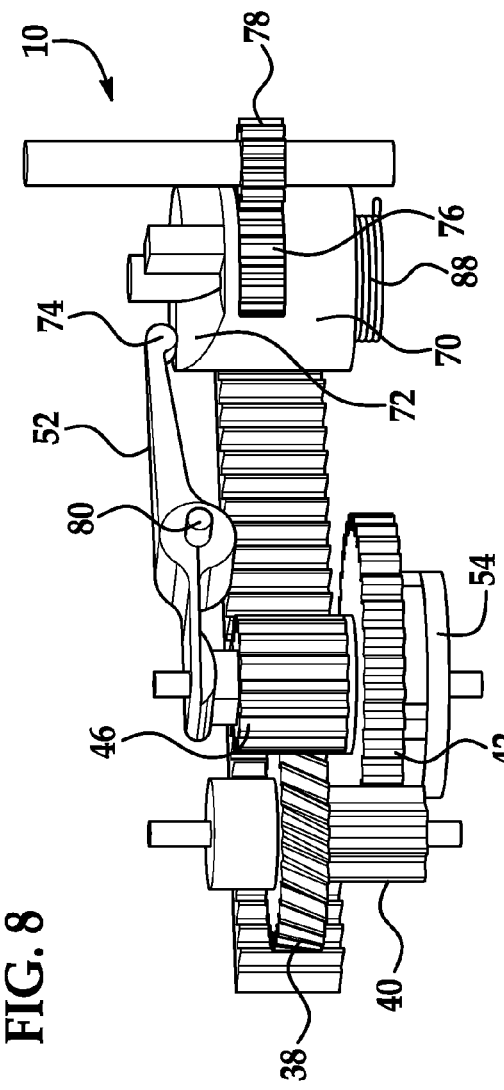
Figure 10:
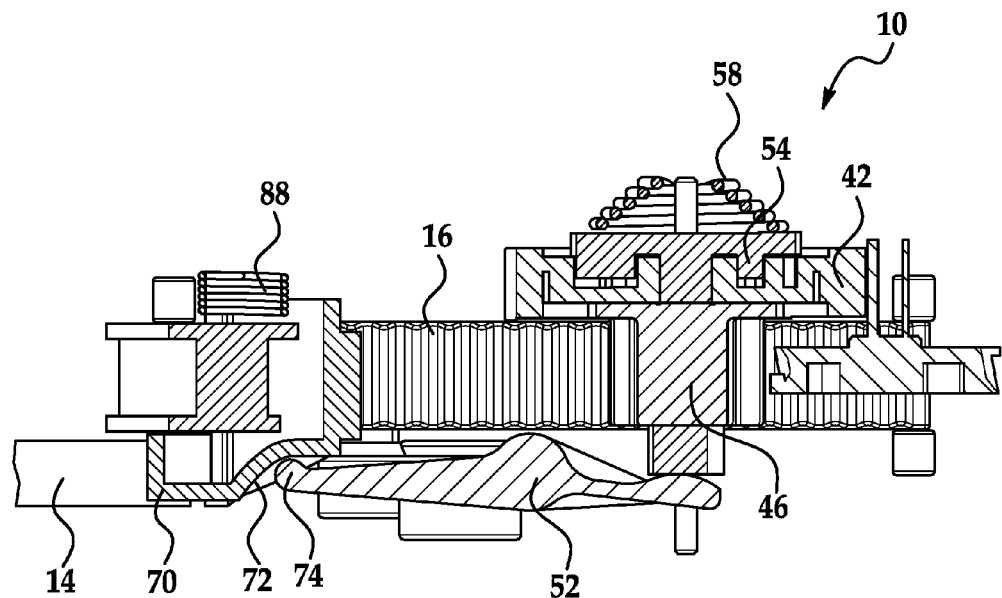
FIGS. 10 and 11 are cross-sectional views of components of the clutch mechanism illustrating movement of the clutch mechanism.
Figure 11:
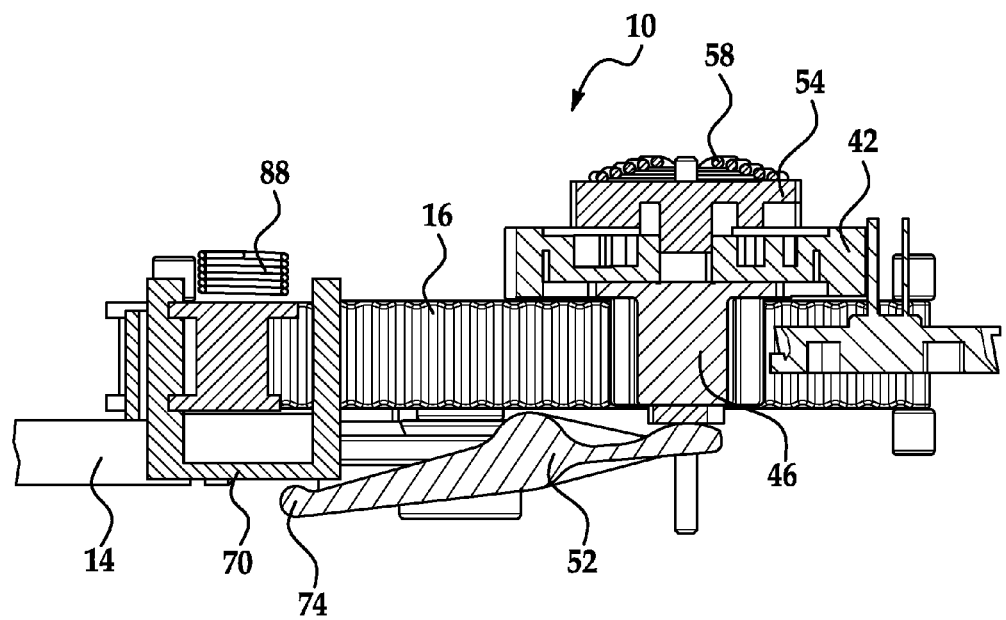

The first position of the clutch lever 52 is illustrated in at least FIGS. 8 and 10 and FIG. 10 illustrates cross-sectional views of portions of the clutch mechanism 30 as well as gears 46 and 42. As illustrated in at least FIGS. 4 and 10 the clutch lever 52 and clutch spool 54 are spring biased into the first position by a spring 58.

The second position of the clutch lever 52 is illustrated in at least FIGS. 4, 7, 9 and 11. The clutch mechanism 30 further comprises a cam gear 70 having a cam surface 72 configured to act upon a portion or one end 74 of clutch lever 52 such that rotation of cam gear 70 in the directions of arrows 48 causes portion 74 of clutch lever 52 two move along cam surface 72 and thus transition the clutch lever 52 from the first position to the second position and thus overcome the biasing force of spring 58 such that clutch spool or clutch component 54 can be moved into a position wherein gears 42 and 46 are decoupled from each other and thus rack 16 is uncoupled from motor 20.

Cam gear 70 further comprises a plurality of teeth 76 configured to engage a gear 78 whose rotation facilitates movement of the cam gear 70 such that clutch lever 52 is moved from the first position to the second position. Alternatively, clutch lever 52 and/or cam gear 70 is coupled to a cable or other actuation device that can be manipulated by an operator in order to transition clutch lever 52 from the first position to the second position and provide the desired movements of the clutch mechanism as well as the rack.

In addition and in one non-limiting exemplary embodiment, the clutch mechanism 30 provides two features. The first one being movement of the clutch spool or clutch component 54 from the first position to the second position in order to disengage the motor 20 from the rack 16 and ultimately the drivetrain of the vehicle while the second one is to move the rack 16 linearly after it has been disengaged from the motor 24 gear train 18. The linear movement of rack 16 by cam gear 70 is facilitated by lever 32 which is coupled to cam gear 70.

Accordingly and as illustrated in the attached figures rotational movement of cam gear 70 in a direction from a first position via a gear 78 will cause portion 74 to slide along cam surface 72 and clutch lever 52 is pivoted about an axis 80 as it moves from the first position to the second position in order to move the clutch spool 54 from the first position to the second position so that gears 42 and 46 are decoupled from each other. At this point or at an intermediate position of cam gear 70, lever 32 is now in contact with a surface 82 of rack 16 and further movement of cam gear 70 in the direction (e.g., from the intermediate position of the cam gear 70 to a second position of the cam gear 70) will cause linear movement of the rack in the direction of arrow 86 which will in turn move the transmission from one gear selection to another.

In one non-limiting embodiment, gear 78 is configured to be moved via a hand tool (e.g., screwdriver from an individual) with a minimal amount of rotating motion merely necessary to disengage motor 20 from rack 16 and then move rack 16 in order to change the vehicle transmission from one selected position to another selected position (e.g., from the first position to the intermediate position to the second position). In the illustrated embodiment, movement of the rack is in a direction 90° offset or perpendicular from movement of the clutch spool 54 or clutch lever 52. Of course, other directions are contemplated to be within the scope of various embodiments of the present invention. Accordingly, the clutch and manual override system provides unique two-stage motion acting on sequential components and perpendicular axes. Of course, numerous other configurations (e.g., other than 90° offset) are contemplated to be within the scope of exemplary embodiments of the present invention.

In one embodiment, gear 78 or a portion thereof is accessible via an access panel in order to provide the rotational movement of gear 78 via a hand tool. See for example slot 79 which may be configured to receive a corresponding screw driver. Of course, numerous other types of configurations are contemplated. Alternatively, gear 78 is operatively coupled to a manual input device in order to provide the desired movement of gear 78 (e.g., cable, lever, etc.) Referring now to at least FIG. 4, cam gear 70 is spring biased into a first position by a spring 88 wherein gear 78 is configured to engage a first end of teeth 76 of cam gear 70 and cam surface 72 has not caused rotational movement of clutch lever 52. Accordingly and as cam gear 70 is rotated via a rotational movement of gear 78 spring 88 will provide a biasing force to return cam gear 70 to the first position such that the clutch mechanism 30 we engages or re-couples motor 22 rack 16. In other words once gear 78 is rotated in order to decouple the motor 20 from the rack 16 and rack 16 is moved via lever 32, spring 88 will cause cam gear 72 rotate back to the first position such that clutch mechanism 30 can be couple motor 22 rack 16 via gear train 18 although rack 16 has now been repositioned via lever 32. In addition and in order to assist in this process spring 58 will also bias the clutch spool 56 back into the first position.

In one non-limiting exemplary embodiment, a two-piece cam gear/lever driven by a separate driver is provided. The cam gear, when rotated, acts upon a clutch lever that is used to push the clutch spool with an initial part of its full rotation. The cam moves the lever through its travel to push the clutch spool to disengage the motor from the drivetrain. Continued rotation of the cam gear after this disengagement impacts an additional lever that pushes the rack a prescribed amount. At the end of this rotation the cam gear is acted upon by a return spring which will rotate the cam gear back to its initial position thereby rotating the lever away from the rack. Final rotation of the cam gear by the return spring will lower the clutch lever allowing a spring acting axially on the clutch spool to return the clutch spool to its original position engaging the motor to the drivetrain. The cam gear/lever can be acted upon by a separate driver either in direct connection by gear teeth or remotely by a cable.

In one non-limiting exemplary embodiment, the actuator 10 (gear train 18 and clutch mechanism 30) are configured such that rotational movement of cam gear 70 will only contact portion 74 of clutch lever 52 when the vehicle transmission is in a predetermined state (e.g., Park) and the two-step rotational movement of the clutch mechanism 30 will first disengage the gear train 18 from the rack and then move the rack via lever 32 to a another predetermined state (e.g., Park to neutral) in order to allow for towing of the vehicle. Of course, numerous other configurations are contemplated to be within the scope of exemplary embodiments of the present invention and the aforementioned movements are merely examples and the various embodiments of the present invention are not intended to be specifically limited to the examples provided herein.

It is, of course, that various configurations and alternatives are considered to be within exemplary embodiments of the present invention and it may or may not be necessary to spring bias cam gear 70 and clutch spool 54 back into their first positions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuator for a shift by wire system, comprising:
a motor;
a rack;
a gear train configured to cause linear movement of the rack in response to rotational movement of the motor;
a clutch mechanism separate from the rack for coupling and decoupling the rack to the motor, wherein the clutch mechanism further comprises a cam gear, wherein rotation of the cam gear in a first direction from an initial position to a first position decouples the rack from the motor and further rotation of the cam gear in the first direction to a second position linearly moves the rack.

2. The actuator as in claim 1, wherein the clutch mechanism further comprises a lever for moving the rack after the clutch mechanism has decoupled the rack from the motor.

3. The actuator as in claim 1, wherein the clutch mechanism further comprises a clutch lever for moving a clutch spool from a first position, to a second position in a first direction, wherein the rack is coupled to the motor via the gear train when the clutch spool is in the first position and wherein the rack is uncoupled to the motor via the gear train when the clutch spool is in the second position.

4. The actuator as in claim 3, wherein the clutch spool is spring biased into the first position.

5. The actuator as in claim 3, wherein the clutch mechanism further comprises a lever for moving the rack in a second direction after the clutch mechanism has decoupled the rack from the motor, wherein the second direction is 90 degrees offset from the first direction.

6. The actuator as in claim 1, further comprising an encoder and a sensor configured to provide signals indicative of the position of the motor to microcontroller operatively coupled to the sensor.

7. The actuator as in claim 1, further comprising a device for providing user inputs to a microcontroller for operating the motor.

8. The actuator as in claim 1, wherein the motor further comprises a worm coupled to a shaft of the motor, wherein rotational movement of the worm causes rotational movement of a worm gear of the gear train.

9. The actuator as in claim 8, wherein the clutch mechanism is configured to decouple the worm gear from the rack.

10. The actuator as in claim 1, wherein the cam gear is spring biased into the initial position.

11. The actuator as in claim 10, wherein the clutch mechanism further comprises a lever for moving the rack after the clutch mechanism has decoupled the rack from the motor, wherein the lever extends from the cam gear.

12. A shift by wire system for a vehicle transmission, comprising:
    an input device;
    a motor;
    a microcontroller operatively coupled to the motor and configured to receive signals from the input device to operate the motor;
    a sensor operatively coupled to the microcontroller and configured to receive signals from sensor, wherein the signals from the sensor are indicative of a position of the motor;
    a rack;
    a gear train configured to cause linear movement of the rack in response to rotational movement of the motor;
    a clutch mechanism separate from the rack for coupling and decoupling the rack to the motor, wherein the clutch mechanism further comprises a cam gear, wherein rotation of the cam gear in a first direction from an initial position to a first position decouples the rack from the motor and further rotation of the cam gear in the first direction to a second position linearly moves the rack.

13. The shift by wire system as in claim 12, wherein the clutch mechanism further comprises a lever for moving the rack after the clutch mechanism has decoupled the rack from the motor.

14. The shift by wire system as in claim 12, wherein the clutch mechanism further comprises a clutch lever for moving a clutch spool from a first position, to a second position in a first direction, wherein the rack is coupled to the motor via the gear train when the clutch spool is in the first position and wherein the rack is uncoupled to the motor via the gear train when the clutch spool is in the second position.

15. The shift by wire system as in claim 14, wherein the clutch spool is spring biased into the initial position.

16. The shift by wire system as in claim 14, wherein the clutch mechanism further comprises a lever for moving the rack in a second direction after the clutch mechanism has decoupled the rack from the motor, wherein the second direction is 90 degrees offset from the first direction.

17. A method of manually overriding a shift by wire system, comprising:
    decoupling a rack of the shift by wire system from a motor by rotating a cam gear from a first position in a first direction to an intermediate position wherein a clutch spool is moved from a first position, wherein the clutch spool couples the motor to the rack to a second position, wherein the clutch spool decouples the rack from the motor; and
    further rotating the cam gear in the first direction from the intermediate position to a second position wherein a lever moves the rack after it has been decoupled from the motor, wherein the cam gear is spring biased into the first position and the clutch spool is spring biased into the first position.

18. The method as in claim 17, wherein the second direction is 90 degrees offset from the first direction.

* * * * *